US008104183B2

(12) United States Patent
Nakamura et al.

(10) Patent No.: US 8,104,183 B2
(45) Date of Patent: Jan. 31, 2012

(54) PORTABLE CUTTING DEVICE CAPABLE OF ADJUSTING CUTTING DEPTH

(75) Inventors: Mizuho Nakamura, Hitachinaka (JP); Shinji Takano, Hitachinaka (JP); Hideaki Terashima, Hitachinaka (JP); Hiroyuki Saitou, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 237 days.

(21) Appl. No.: 11/677,602

(22) Filed: Feb. 22, 2007

(65) Prior Publication Data

US 2007/0193040 A1 Aug. 23, 2007

(30) Foreign Application Priority Data

Feb. 22, 2006 (JP) ............................... P2006-045945

(51) Int. Cl.

| | |
|---|---|
| ***B23D 47/02*** | (2006.01) |
| ***B23D 51/02*** | (2006.01) |
| ***B23D 45/16*** | (2006.01) |
| ***B27B 9/02*** | (2006.01) |
| ***B27B 21/08*** | (2006.01) |

(52) U.S. Cl. ............................... 30/388; 30/375; 30/505

(58) Field of Classification Search .................... 30/388, 30/505, 511, 375, 390, 391

See application file for complete search history.

(56) References Cited

U.S. PATENT DOCUMENTS

| | | | | |
|---|---|---|---|---|
| 949,179 | A * | 2/1910 | Gilbert | 192/50 |
| 3,262,472 | A * | 7/1966 | McCarty et al. | 30/376 |
| 3,417,802 | A * | 12/1968 | Oldenkott | 411/134 |
| 4,221,051 | A * | 9/1980 | Glass | 30/377 |
| 4,957,235 | A * | 9/1990 | Beno et al. | 227/156 |
| 4,982,501 | A * | 1/1991 | Sauerwein et al. | 30/376 |
| 5,011,351 | A * | 4/1991 | Terry | 411/144 |
| 5,090,855 | A * | 2/1992 | Terry | 411/144 |
| 5,381,602 | A * | 1/1995 | Matzo et al. | 30/377 |
| 5,394,968 | A * | 3/1995 | Yu-Shu | 192/69.4 |
| 5,626,449 | A * | 5/1997 | McKinlay | 411/149 |
| 5,733,061 | A * | 3/1998 | Child | 403/385 |
| 5,758,425 | A * | 6/1998 | Gallagher et al. | 30/376 |
| 6,101,914 | A * | 8/2000 | Brunson et al. | 83/581 |
| 6,347,915 | B1 * | 2/2002 | Balzano | 411/149 |
| 6,886,259 | B2 * | 5/2005 | Kani | 30/376 |
| 7,128,511 | B2 * | 10/2006 | Hewgill | 411/149 |
| 7,168,902 | B2 * | 1/2007 | Terry | 411/160 |
| 7,261,506 | B2 * | 8/2007 | Smolarek | 411/161 |
| 7,281,332 | B2 * | 10/2007 | Niwa et al. | 30/376 |

FOREIGN PATENT DOCUMENTS

| | | |
|---|---|---|
| JP | 2004-330657 | 11/2004 |

* cited by examiner

*Primary Examiner* — Ghassem Alie
*Assistant Examiner* — Bharat C Patel
(74) *Attorney, Agent, or Firm* — Antonelli, Terry, Stout & Kraus, LLP.

(57) ABSTRACT

A portable cutting device capable of changing and adjusting a cutting depth of a circular saw blade relative to a base with lesser labor. A saw cover is pivoted on the base to change the cutting depth. An adjustment guide extends from the base in a pivotally moving direction of the saw cover in a superposed relation to the saw cover. A tightening unit is disposed to the saw cover at a position superposed with the adjustment guide and the saw cover for providing a selective tightening between the saw cover and the adjustment guide. The tightening unit includes a shaft part extending through the saw cover and the adjustment guide, a pivot operation part pivotally movable about an axis of the shaft part, and an urging part disposed over the shaft part and movable by the pivot operation part in the axial direction of the shaft part.

2 Claims, 6 Drawing Sheets

PORTABLE CUTTING DEVICE CAPABLE OF ADJUSTING CUTTING DEPTH

BACKGROUND OF THE INVENTION

The present invention relates to a portable cutting device, and particularly, to a portable cutting device capable of adjusting a cutting depth.

There has been a conventional portable cutting device for cutting a workpiece such as a wood. This type of portable cutting device mainly includes a circular saw blade and a motor as a drive device. Therefore, the cutting device provides good portability and is prevailingly used not only in factories but also at construction sites.

Wooden members to be cut by the portable cutting device have thicknesses different from one another. Therefore, high or even cutting efficiency is required in the cutting device in order to cut a thick workpiece as well as a thin workpiece. To this effect, Japanese Patent Application Publication No. 2004-330657 discloses a cutting device in which a saw cover supporting a circular saw blade is pivotably movably supported to a base adapted to be in contact with the workpiece. With this arrangement, an amount of protrusion of the circular saw blade from the base can be changed in accordance with the pivot amount of the saw cover.

In the portable cutting device disclosed in the Japanese publication, a pivot posture of the saw cover is fixed to the base by tightening a screw, so that a predetermined protrusion amount of the saw blade can be maintained. However, the screw needs to be rotated a plurality of times to tighten/release the pivot posture. This operation needs some effort and degrades working efficiency.

SUMMARY OF THE INVENTION

It is therefore, an object of the present invention to provide a portable cutting device capable of changing a cutting depth with lesser labor.

This and other objects of the present invention will be attained by a portable cutting device including a housing, a motor disposed in the housing, a circular saw blade driven by the motor for cutting a workpiece, a saw cover provided to the housing and covering a generally half region of the circular saw blade, a base supporting the saw cover and in contact with the workpiece to be cut, and a mechanism for changing protrusion amount of the circular saw blade from the base. The mechanism includes a pivot support portion that pivotably movably supports the saw cover with respect to the base, and a regulating portion that selectively fixes a pivot posture of the saw cover relative to the base. The regulating portion includes an adjustment guide and a tightening unit. The adjustment guide extends from the base in a pivotally moving direction of the saw cover in a superposed relation to the saw cover. The tightening unit is disposed at a position superposed with the adjustment guide and the saw cover for providing a selective tightening between the saw cover and the adjustment guide. The tightening unit includes a shaft part, a pivot operation part, and an urging part. The shaft part extends through the saw cover and the adjustment guide and extends out of the saw cover. The pivot operation part is pivotally movable about an axis of the shaft part. The urging part is disposed over the shaft part and is in contact with the pivot operation part. The urging part is movable in a direction of the axis of the shaft part upon pivot movement of the pivot operation part for increasing a tightening force between the saw cover and the adjustment guide.

BRIEF DESCRIPTION OF THE DRAWINGS

In the drawings;

FIG. 5(*b*) an enlarged cross-sectional side view of a rear portion of the saw cover in a cutting direction;

FIG. 6(*b*) is a cross-sectional view taken along the line VI-VI;

FIG. 9(*b*) is a rear perspective view of the washer;

FIG. 10(*b*) is a rear perspective view of the pivot operation part;

DETAILED DESCRIPTION OF THE PREFERRED EMBODIMENTS

Figure 1:
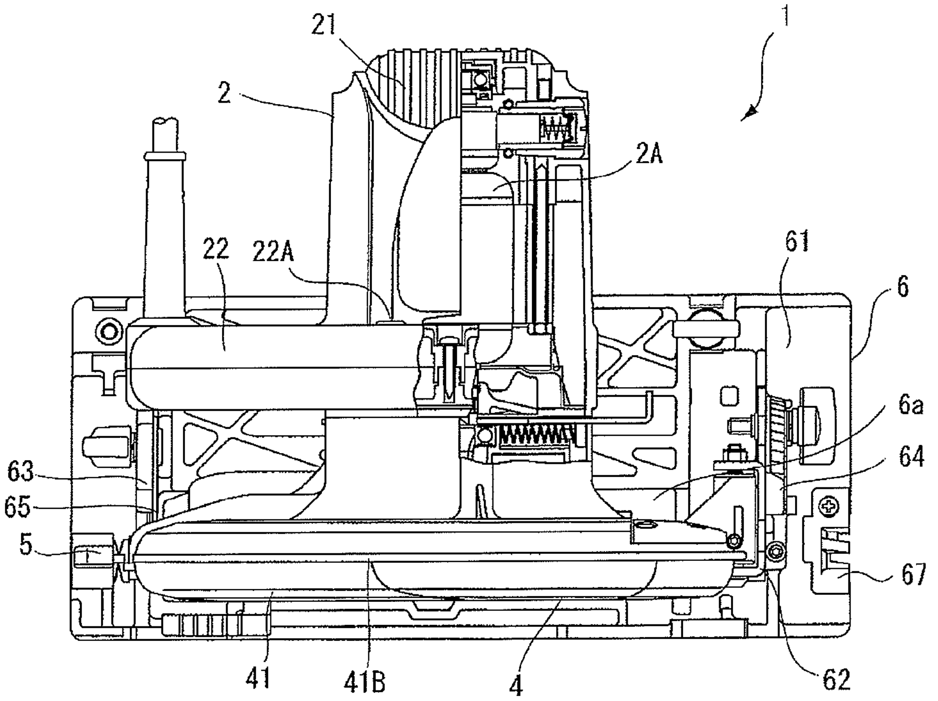
FIG. 1 is a plan view of a portable cutting device according to an embodiment of the present invention.

A portable cutting device according to an embodiment of the present invention will be described with reference to FIGS. 1 to 16. A circular saw 1 shown in FIG. 1 mainly includes a housing 2, a circular saw blade 3, a saw cover 4 and a base 6.

The housing 2 mainly includes a motor accommodation part 21 accommodating therein a motor 2A, and a handle part 22 integral with the motor accommodation part 21. A drive system (not shown) driven by the motor 2A is provided in the saw cover 4. A circular saw blade 3 is rotationally driven by the drive system. The handle part 22 is provided with a switch (not shown) for controlling driving of the motor 2A, and a stopper 22A (FIG. 1) for holding the switch in an ON state.

Figure 2:
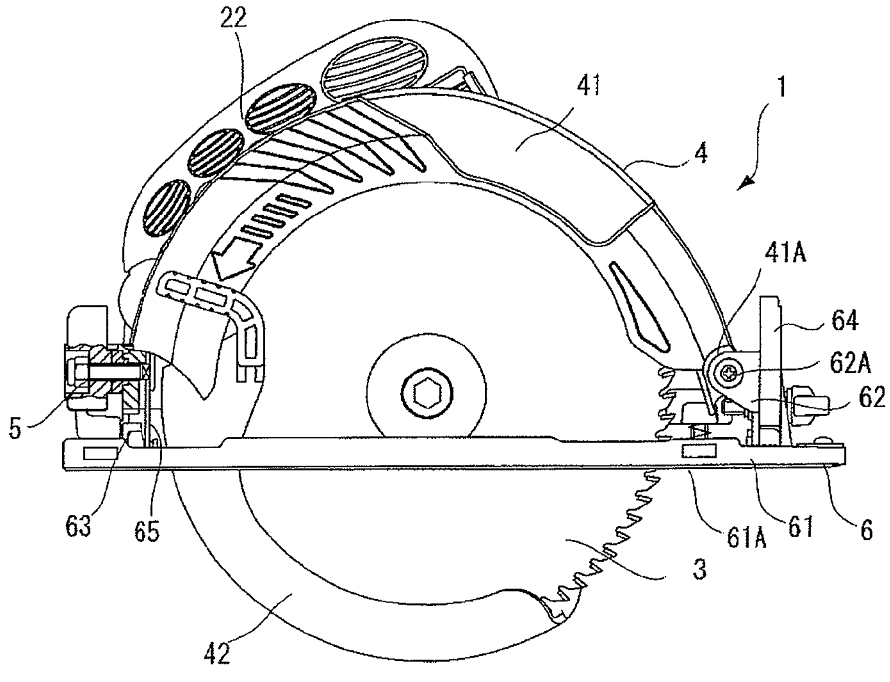
FIG. 2 is a side view of the portable cutting device according to the embodiment of the invention, when observed from a side opposite to a housing.

The saw cover 4 is provided at a position opposite to the motor accommodation part 21 with respect to the handle 22. As shown in FIG. 2, the saw cover 4 includes a saw cover body part 41 connected to the housing 2, and a safety cover 42 provided on the saw cover body part 41 for covering the circular saw blade 3.

Figure 5A:
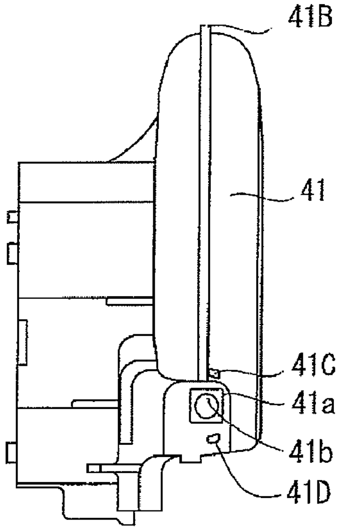
FIG. 5(*a*) is a rear view of a saw cover of the portable cutting device according to the embodiment.
Figure 5B:
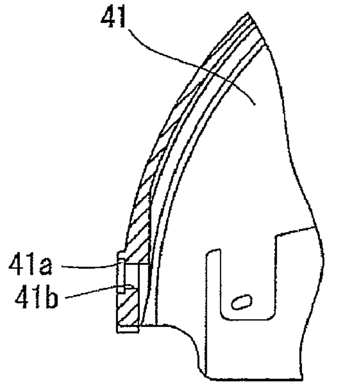

The saw cover body part 41 is made from a metal and covers substantially a half of the circular saw blade 3 as shown in FIG. 2. A connecting part 41A is provided at one end of the saw cover body part 41 in a circumferential direction thereof. The connecting part 41A is adapted to be connected to a pivot support part 62 described later. A rib 41B (FIG. 1) is provided at the saw cover body part 41 at a position coincident with the circular saw blade 3. As shown in FIG. 5(*a*) and FIG. 5(*b*), the saw cover body part 41 has another end in the circumferential direction formed with a rectangular groove part 41*a* as a substantially square concave part at a position in line with the rib 41B. Further, a through-hole 41*b* is formed in a bottom part of the rectangular groove part 41*a*.

A tightening part 5 is disposed at the rectangular groove part 41*a* and the through-hole 41*b* for tightening and releasing a guide 65A (described later) relative to the saw cover body part 41. A first stopper 41C protrudes from the saw cover body part 41 at a position near the rectangular groove part 41*a* and in approximate alignment with the rib 41B. A second stopper 41D protrudes from the saw cover body part 41 in substantially the same protruding direction as the first stopper 41C. The second stopper 41D is positioned at an end portion of the saw cover body part 41 and near the rectangular groove part 41*a*.

The safety cover 42 is pivotally supported to the saw cover body part 41 and is movable along the saw cover body part 41 in the circumferential direction thereof. A spring (not shown) is interposed between the saw cover body part 41 and the safety cover 42 for biasing the safety cover 42 in a circumferential direction of the saw cover body part 41 from the other end side toward the one end side of the saw cover body part 41. Therefore, while cutting work is not carried out, the safety cover 42 covers, in a direction from the another end side toward the one end side, a remaining part of the circular saw blade 3 which is not covered by the saw cover body part 41.

Accordingly, the circular saw blade 3 can be partly exposed to an atmosphere at an area between the one end of the saw cover body part 41 and a leading end of the safety cover 42. This exposing area of the blade serves as a cutting area to cut a workpiece, allowing the circular saw 1 to move forward for cutting the wooden material in a direction from the other end to the one end of the saw cover body part 41. Hence, the direction from the other end to the one end of the saw cover body part 41 is defined as a cutting direction. The one end side of the saw cover body part 41 is defined as a leading end side in the cutting direction, as well as the other end side a rear side in the cutting direction.

As shown in FIG. 1, the base 6 includes a base member 61, the pivot support part 62, a first bevel plate 63, a second bevel plate 64, and a link 65 serving as an adjustment guide. The base 6 pivotably and laterally tiltably supports the housing 2, circular saw blade 3, and saw cover 4 through the saw cover 4.

The base member 61 is a main constituent of the base 6 having a substantially rectangular plate like shape and made from a metal. A major side of the base member 61 is oriented in the cutting direction. An elongated slot 6*a* extending in the lengthwise direction is formed in the base member 61. The elongated slot 6*a* allows the circular saw blade 3 and the safety cover 42 to pass therethrough.

Figure 3:
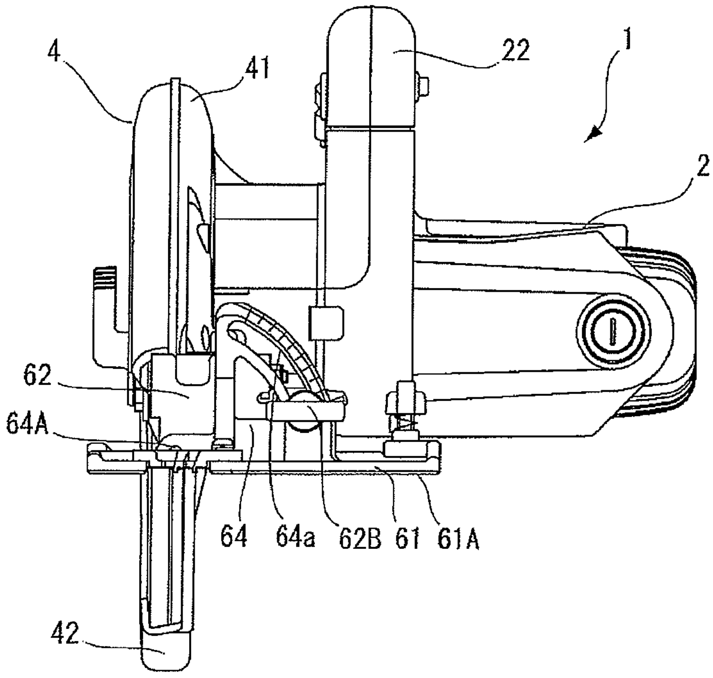
FIG. 3 is a front view of the portable cutting device according to the embodiment.

As shown in FIG. 1, the second bevel plate 64 and pivot support part 62 are provided at the front side of the elongated slot 6*a* in the cutting direction in the base member 61. As shown in FIG. 3, the second bevel plate 64 extends vertically from the base member 61 in a direction substantially perpendicular to the cutting direction, and has a second tilt axis part 64A extending in the cutting direction. An arcuate slot 64*a* whose center of radius is coincident with the second tilt axis part 64A is formed in the second bevel plate 64.

As shown in FIG. 1, the pivot support part 62 is laterally tiltably movably supported to the second tilt axis part 64A. The pivot support part 62 has a pair of arm parts extending toward the rear side in the cutting direction. The arm parts are provided with a pivot axis part 62A whose axis extends perpendicular to the cutting direction. This pivot axis part 62A pivotally movably supports the connecting part 41A positioned at front side of the saw cover body part 41 in the cutting direction.

The pivot support part 62 is formed with a female thread (not shown). A screw 62B extends through the arcuate slot 64*a* of the second bevel plate 64 and is threadingly engaged with the female screw. Upon fastening the screw 62B the tilt angle of the pivot support part 62 relative to the second bevel plate 64 can be fixed to an arbitrary angle.

Figure 4:
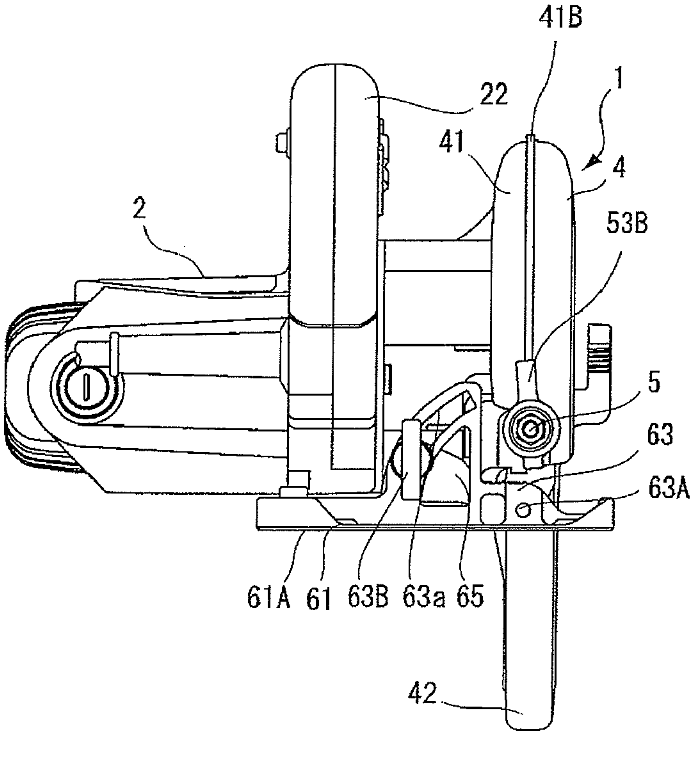
FIG. 4 is a rear view of the portable cutting device according to the embodiment.

As shown in FIGS. 1 and 2, the first bevel plate 63 and link 65 are provided at a rear side of the elongated slot 6*a* in the cutting direction in the base member 61. As shown in FIG. 4, the first bevel plate 63 is configured to have a shape symmetrical to the second bevel plate 64 with respect to the elongated slot 6*a*. A first tilt axis part 63A is provided on an extension of the second tilt axis part 64A. An arcuate slot 63*a* whose center of radius is coincident with the first tilt axis part 63A is formed in the first bevel plate 63.

Figure 6A:
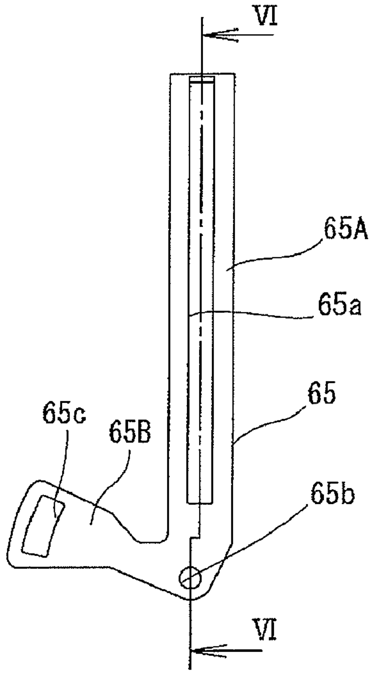
FIG. 6(*a*) is a plan view of a link of the portable cutting device according to the embodiment.
Figure 6B:
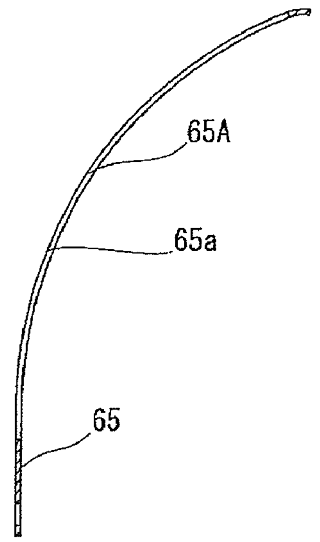
Figure 7:
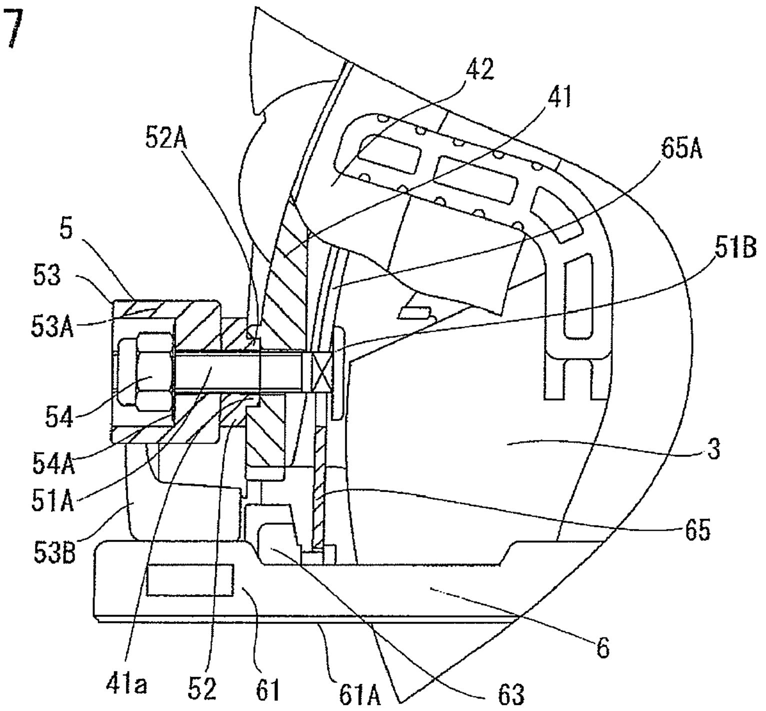
FIG. 7 is a side cross-sectional view depicting a periphery of a connecting part of the portable cutting device according to the embodiment.

As shown in FIGS. 6(*a*) and 6(*b*), the link 65 is constituted by a guide 65A extending substantially arcuate fashion, and a base part 65B provided at a base end of the guide 65A. As shown in FIG. 7, the link 65 is inserted inside the saw cover body part 41 along an inner peripheral wall thereof.

As shown in FIGS. 6(*a*) and 6(*b*), the guide 65A is formed with a slit 65*a* extending in a lengthwise direction thereof, and a through-hole 65*b* positioned at a base end side of the guide 65A. A bolt 51 described later extends through the slit 65*a* with sliding relation thereto. The hole 65*b* allows the first tilt axis part 63A to be inserted. The base part 65B is positioned in superposed relation to the first bevel part 63. An arc-type slit 65*c* is formed in the base part 65B such that a distance between the hole 65*b* and the arc-type slit 65*c* is substantially equal to a distance between the first tilt axis part 63A and the arcuate slot 63*a* of the first bevel part 63.

A screw fastener 63B penetrates through the arc-type slit 65*c* and the arcuate slot 63*a*. A tilt angle of the link 65 relative to the first bevel plate 63 can be fixed to an arbitrary angle by the screw fastener 63B. Accordingly, the first bevel plate 63 and second bevel plate 64 enable the housing 2 and saw cover 4 to be tilted in lateral direction of FIG. 3 via the link 65 and pivot support part 62.

As shown in FIG. 1, a pointer part 67 indicating a cutting position is provided at a frontmost end of the base member 61 in the cutting direction. The pointer part 67 is positioned in alignment with an intersection between a plane including the circular saw blade 3 and the base member 61. The base member 61 has a contact face 61A which contacts a surface of the workpiece at an opposite surface where the second bevel plate 64 and the like are provided.

The tightening part 5 shown in FIGS. 1 and 7 includes the bolt 51, a washer 52, a pivot operation part 53, and a nut 54. A regulator part is constituted by the tightening part 5 and the guide 65A, and a protrusion change mechanism for the circular saw blade 3 is constituted by the regulator part and the pivot support part 62.

Figure 8:
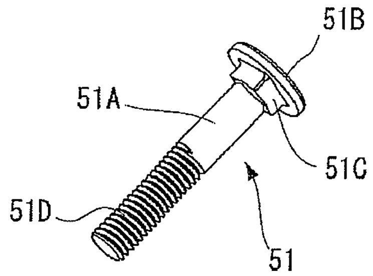
FIG. 8 is a perspective view depicting a bolt of the portable cutting device according to the embodiment.

As shown in FIG. 8, the bolt 51 has a shaft part 51A, a flange part 51B, a square part 51C and a thread part 51D. The flange part 51B is provided at a base end side of the shaft part 51. The square part 51C is positioned between the shaft part 51A and the flange part 51B and has a substantially square cross-section in a direction perpendicular to axial direction of the shaft part 51A. The threaded part 51D is provided at a tip end side of the shaft part 51A.

The square part 51C has a side having a length substantially equal to a width of the slit 65*a* in the link 65. The bolt 51 is associated with the saw cover body part 41 and the link 65 in such a manner that the shaft part 51A penetrates through the slit 65*a* and a through-hole 41*b*, and the square part 51C is inserted into and engaged with the slit 65*a*. Since the square part 51C is inserted in the slit 65*a*, the rotation of the bolt 51 about its axis is prevented.

Figure 9A:
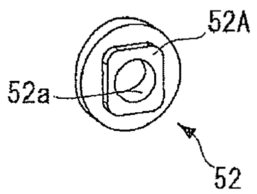
FIG. 9(*a*) is a front perspective view depicting a washer of the portable cutting device according to the embodiment.
Figure 9B:
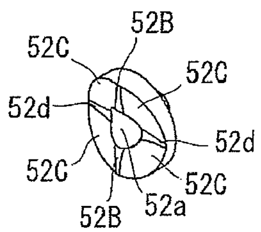

As shown in FIGS. 9(*a*) and 9(*b*), the washer 52 has one end face provided with a rectangular protrusion part 52A having a substantially square cross-section. The washer 52 has another end face provided with a pair of convex parts 52B which face and contact the pivot operation part 53, a pair of concave parts 52*d*, and a plurality of slope parts 52C each defined between each one of the pair of convex parts 52B and each one of the pair of concave parts 52*d*. A through-hole 52*a* penetrating from one end face to the other end face is formed at a substantial center position of the washer 52. The plurality of slope parts 52C each defined between each one of the pair of convex parts 52B and each one of the pair of concave parts 52*d* are arrayed at an even pitch in a circumferential direction around the through-hole 52*a*.

The square protrusion part 52A has a side length substantially equal to a side length of the rectangular groove part 41*a*. Therefore, as shown in FIG. 7, the washer 52 is attached to the saw cover body part 41 such that the rectangular protrusion part 52A is fitted with the rectangular groove part 41*a*. In this manner, the washer 52 can be held by the saw cover body part 41 while rotation of the washer 52 about the axis of the through-hole 52*a* is prevented. The shaft part 51A of the bolt 51 is inserted through the through-hole 52*a*. Further, the washer 52 is configured as a member separate from the saw cover body part 41, the guide 65A, and the like. Therefore, the washer 52 can be made from an impregnated material, typically a bearing material having high durability and lubricity.

Figure 10A:
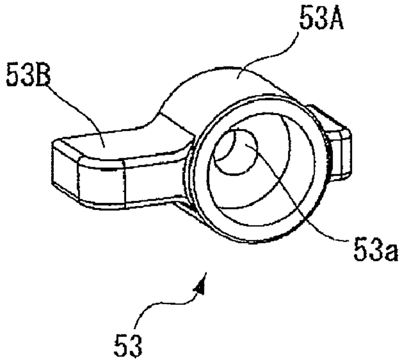
FIG. 10(*a*) is a front perspective view depicting a pivot operation part of the portable cutting device according to the embodiment.
Figure 10B:
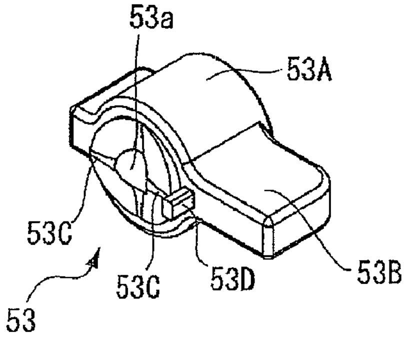

As shown in FIG. 10, the pivot operation part 53 includes a body part 53A and a lever 53B. The body part 53A has a center portion formed with a through-hole 53*a* penetrating through a thickness thereof. The body part 53A has one end face provided with a pair of protrusion parts 53C around the through hole 53*a*. The protrusion parts 53C are adapted to face and contact with the other end face of the washer 52. The pair of protrusion parts 53C are arrayed around the through-hole 53*a* at an even pitch in a circumferential direction of the through-hole 53*a*. A protrusion 53D protrudes from the one end face of the body part 53A at a position near one of the protrusion parts 53C and remote from the through-hole 53*a*. The protruding direction of the protrusion 53D is equal to that of the protrusion parts 53C. The lever 53B extends from a peripheral part of the pivot operation part 53 in a direction substantially perpendicular to an axis of the through-hole 53*a*.

The pivot operation part 53 is set on the washer 52 so that the pair of protrusion parts 53C are brought into abutment with the pair of concave parts 52*d* of the washer 52. The shaft part 51A of the bolt 51 extends through the through-hole 53*a*. In this case, the protrusion 53D is positioned between the first stopper 41C and the second stopper 41D (see FIG. 5(*a*)). The protrusion 53D is abuttable against the first stopper 41C and the second stopper 41D to prevent the pivot operation part 53 from its excessive rotation, to thus prevent the protrusion parts 53C from climbing over the protrusion parts 52B.

The threaded part 51D of the bolt 51 penetrating the through-hole 53*a* is fastened with a nut 54 while interposing a flat washer 54A between the nut 54 and the pivot operation part 53. Therefore, the guide 65A, saw cover body part 41, washer 52, pivot operation part 53, and flat washer 54A are interposed between the flange part 51B and the nut 54.

Figure 11:
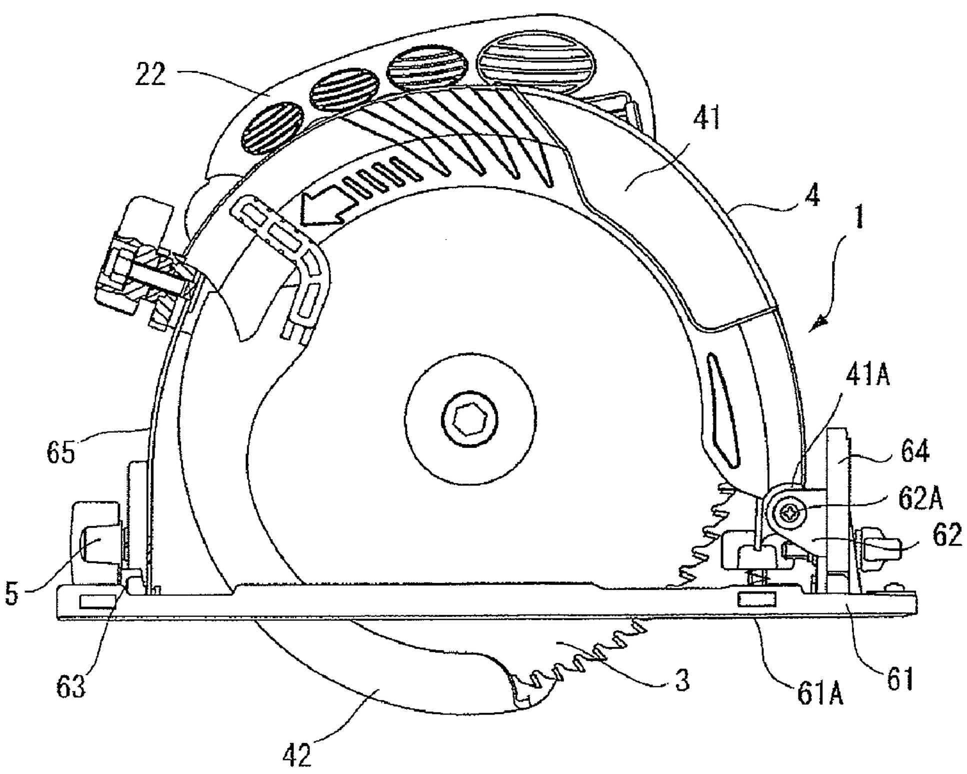
FIG. 11 is a side view showing the portable cutting device according to the embodiment and observed from the opposite side to the housing in a state where an amount of protrusion of a circular saw blade is changed.

In operation, for changing an amount of protrusion of the circular saw blade 3 from the contact face 61A, the housing 2 and the saw cover 4 are pivoted about the pivot axis part 62A of the pivot support part 62 such that the pivot axis part 62A functions as a fulcrum. At this time, the saw cover body part 41 is slidingly moved relative to the guide 65A. Thus, the housing 2 and the saw cover 4 are moved up and down in FIG. 2 about the pivot axis part 62A relative to the base 6. As a result, the amount of protrusion of the circular saw blade 3 from the contact face 61A changes (FIG. 11).

Figure 12:
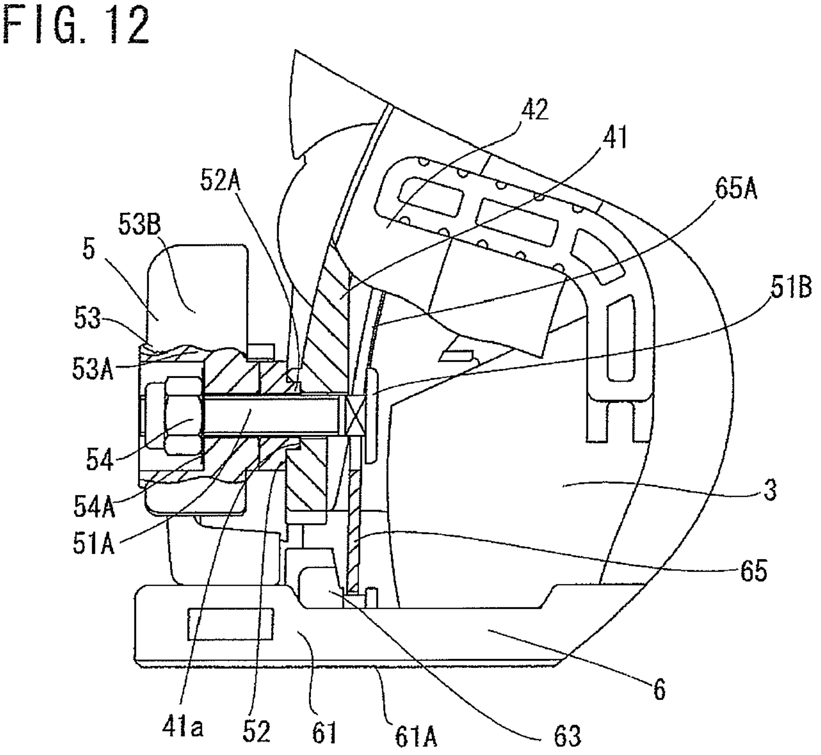
FIG. 12 is a side cross-sectional view depicting a connecting part in the embodiment in a state where a saw cover body part and a guide are tightened.

To fix the posture of the housing 2 and saw cover 4 relative to the base 6 for maintaining the intended protrusion amount, the pivot operation part 53 is pivoted as shown in FIG. 12. More specifically, the lever 53B is pivoted in a clockwise direction in FIG. 4 so that an extension direction of the lever 53B is substantially parallel to the direction of the rib 41B. Since the lever 53B is set substantially parallel to the rib 41B upon fixing, the lever 53B can be prevented from protruding out from the saw cover 4 toward the housing 2 and toward a side opposite to the housing 2. Therefore, the lever 53B does not affect tilting operation when the saw cover 4 is to be laterally tilted relative to the base 6 about the first and second tilt axis parts 63A and 64A. Further, the lever 53B does not affect cutting operation while the saw cover 4 and the saw blade is laterally tilted relative to the base 6.

Alternatively, the lever 53B can be configured to be oriented toward the side of the motor 2A when the protrusion part 53C is positioned closest to the convex part 52B. In the latter case, accidental abutment of the lever 53B onto the base 6 can be avoided when the saw cover 4 is laterally tilted to a side opposite to the motor 2A.

Figure 13:
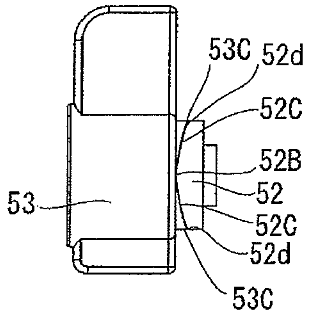
FIG. 13 is a plan view depicting the washer and the pivot operation part of the portable cutting device according to the embodiment.
Figure 14:
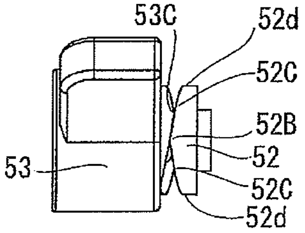
FIG. 14 is a plan view depicting the washer and the pivot operation part of the portable cutting device according to the embodiment in a state where the pivot operation part is pivotally moved.

Prior to pivoting motion of the pivot operation part 53, the pivot operation part 53 and the washer 52 are in contact with each other while the pair of protrusion parts 53C are faced to the pair of concave parts 52*d* as shown in FIG. 13. By pivoting the pivot operation part 53, the protrusion parts 53C slide on the slope parts 52C to move close to the convex parts 52B as shown in FIG. 14. Incidentally, since the protrusion 53D of the pivot operation part 53 is located between the first stopper 41C and the second stopper 41D (FIG. 9(*a*)), pivoting motion of the pivot operation part 53 is restricted in such a manner that the pair of protrusion parts 53C do not climb over the convex part 52B.

Since the plurality of protrusion parts 53C and the plurality of convex parts 52B are arrayed at an even pitch, the pivot operation part 53 and the washer 52 relatively move away from each other in axis direction of the bolt in parallel with each other as the pivot operation part 53 is pivoted. Therefore, as shown in FIG. 12, a distance in an axial direction of the bolt 51 from an end face of the pivot operation part 53 at the side of the nut 54 to an end face of the washer 52 at the side of the saw cover body part 41 becomes longer than that the state prior to the pivotal motion of the pivot operation part 53 as shown in FIG. 7.

However, a distance from the end face of the nut 54 to an end face of the flange part 51B is unchanged before and after pivoting the pivot operation part 53. Therefore, a distance from the washer 52 to the flange part 51B is shortened as the distance from the pivot operation part 53 to the washer 52 is increased. As a result, the guide 65A is urged toward the saw cover body part 41 by the flange part 51B, and the saw cover body part 41 and guide 65A are fixedly held between the washer 52 and flange part 51B. Consequently, the position of the housing 2 and the saw cover 4 relative to the base 6 is fixed, so that the amount of protrusion of the circular saw blade 3 from the contact face 61 is fixed.

The pivot operation part 53 need not be rotated a large number of times, but the housing 2 and the circular saw blade 3 can be suitably fixed to the base 6 at a predetermined pivot angle by the angular pivoting motion of the pivot operation part 53. When fixing the saw cover body part 41 and the guide 65A together, increased moving distance of the washer 52 can result per angular movement of the pivot operation part 53. This is in high contrast to the axial moving distance of an ordinary screw in accordance with its screwing motion. Thus, in the above described embodiment, since the washer 52 can be moved relatively greater stroke in the axial direction of the shaft part 51A, prompt fixing and prompt release of the saw cover 4 relative to the base 6 can be performed.

In the above configuration, since two or more convex parts 52B are arrayed evenly in a circumferential direction, the pivot operation part 53 and the washer 52 move relatively in their axial directions in parallel with each other. Accordingly, force acting on the washer 52 is not deviated when the pivot operation part 53 is operated. Therefore, the tightening part 5 does not cause rattling but the saw cover body part 41 and guide 65A can be fixed suitably upon tightening. Consequently, unwanted change in cutting depth during tightening operation can be avoided, and prolonged service life of components can result. Since a position of the pivot operation part 53 in the axial direction of the shaft part 51A can be defined by the nut 54, fine adjustment can be carried out to maintain suitable tightening, even when the convex parts 52B and protrusion parts 53C are frictionally worn.

According to the above-described embodiment, the pivot operation part 53 is provided with a protrusion 53D to regulate the pivot angle of the part 53. However, the protrusion 53D can be dispensed with. In the latter case, the protrusion parts 53C of the pivot operation part 53 slide on one of the slope parts 52C and can be positioned near the pair of convex parts 52B, regardless of the pivotal moving direction (clockwise or counterclockwise direction) of the pivot operation part 53. Accordingly, the pivot operation part 53 and the washer 52 move away relatively from each other in parallel with each other. The saw cover body part 41 and guide 65A can thus be tightened suitably.

Figure 15:
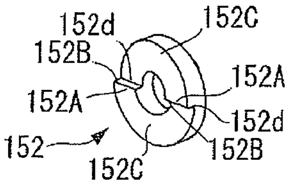
FIG. 15 is a perspective view of a washer according to a modification to the embodiment.
Figure 16:
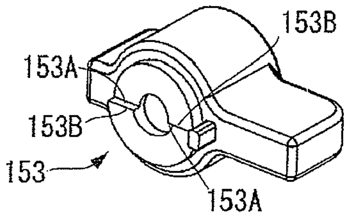
FIG. 16 is a perspective view of a pivot operation part according to a modification to the embodiment.

FIGS. 15 and 16 show modifications to a washer and a pivot operation part, respectively. In FIG. 15, a washer 152 can be provided with a pair of step parts 152A. An upper stage of each of the step part 152A is defined as a convex part 152B, and a lower stage thereof is defined as a concave part 152*d*. Each face connecting the convex part 152B of one step part 152A to the concave part 152*d* of another step part 152A is defined as a slope part 152C. Similarly, in a pivot operation part 153 as shown in FIG. 16, a pair of similar step parts 153A, 153A can be provided, and an upper stage of each of the step parts 153A is defined as a protrusion part 153B. Further, the pivot operation part 153 and the washer 152 are brought into contact with each other so that the protrusion parts 153B and the concave parts 152*d* face each other. According to this configuration, in case of pivoting in one circumferential direction of a bolt now shown, the step parts 152A of the washer 152 and the step parts 153A of the pivot operation part 153 are abuttable with each other, thereby preventing pivoting. In case of pivoting in another circumferential direction, the step parts 152A and 153A are not abutted with each other but the protrusion parts 153B can slide on the slope parts 152C so that the pivot operation part 153 and the washer 152 can be moved away relatively from each other in parallel with each other.

Also, in the above-described embodiment, the pivot operation part is provided with protrusion parts, whereas the washer is provided with concave and convex parts. However, the pivot operation part can be provided with concave and convex parts whereas the washer can be provided with protrusion parts.

Further, in the above-described embodiment, the shaft part 51A of the bolt 51 can be unrotatably supported to the guide 65. However, the shaft part can be rotatably supported to the guide 65. In the latter case, the pivot motion of the pivot operation part and rotation of the shaft part must be concurrently performed. That is, the pivot operation part and the shaft part can be integrally formed.

While the invention has been described in detail and with reference to specific embodiment thereof, it would be apparent to those skilled in the art that various changes and modifications may be made therein without departing from the spirit and scope of the invention.

What is claimed is:

1. A portable cutting device comprising:
- a housing;
- a motor disposed in the housing;
- a circular saw blade driven by the motor for cutting a workpiece;
- a saw cover provided to the housing and covering a generally half region of the circular saw blade;
- a base supporting the saw cover and in contact with the workpiece to be cut; and
- a mechanism for changing protrusion amount of the circular saw blade from the base; the mechanism comprising a pivot support portion that pivotably movably supports the saw cover with respect to the base, and a regulating portion that selectively fixes a pivot posture of the saw cover relative to the base, the regulating portion comprising:
- an adjustment guide extending from the base in a pivotally moving direction of the saw cover in a superposed relation to the saw cover; and
- a tightening unit disposed at a position superposed with the adjustment guide and the saw cover for providing a selective tightening between the saw cover and the adjustment guide, the tightening unit being movable in a radial direction of the circular saw blade to enable fastening of the saw cover and the adjustment guide, the tightening unit comprising:
- a shaft part extending through the saw cover and the adjustment guide and extending out of the saw cover;
- a pivot operation part pivotally movable about an axis of the shaft part; and
- an urging part disposed over the shaft part and in contact with the pivot operation part, the urging part being movable in a direction of the axis of the shaft part upon pivot movement of the pivot operation part for increasing a tightening force between the saw cover and the adjustment guide;

wherein one of the urging part and the pivot operation part is provided with a convex part protruding toward the remaining one of the urging part and the pivot operation part, and a slope part sloping down from the convex part, the convex part and the slope part being alternately arrayed in a circumferential direction of the shaft part;

wherein remaining one of the urging part and the pivot operation part is provided with a protrusion part protruding toward the one of the urging part and the pivot operation part and in abutment with the one of the urging part and the pivot operation part, the protrusion part being slidable on the slope part; and wherein the pivot operation part comprises a body part disposed over the shaft part, and a lever part extending from the body part in a direction perpendicular to the shaft part, the lever part being pivotally moved in either clockwise direction or counter-clockwise direction for tightening between the saw cover and the adjustment guide.

2. The portable cutting device as claimed in claim 1, wherein the lever part comprises a major part extending from the shaft part, and a minor part extending from the shaft part and positioned opposite to the major part with respect to the shaft part, the minor part having a length smaller than that of the major part, and wherein the major part is positioned opposite to the base with respect to the shaft part when the protrusion part is positioned closest to the convex part.

* * * * *